No. 771,703.  
PATENTED OCT. 4, 1904.  
R. L. BOWMAN.  
COOLING AND LUBRICATING CRANK CASE ENGINES.  
APPLICATION FILED APR. 23, 1904.  
NO MODEL.  
2 SHEETS—SHEET 1.
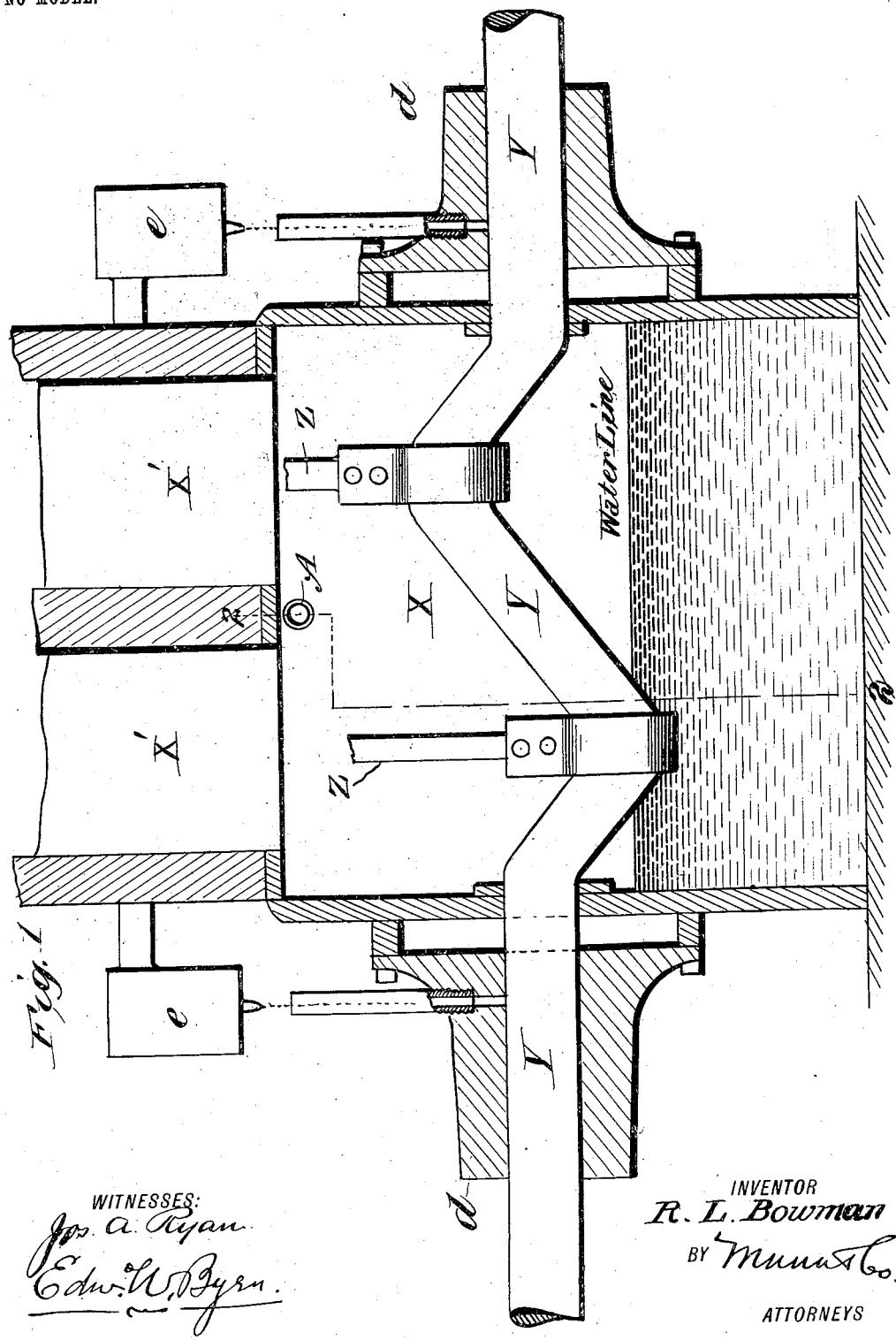
WITNESSES:  
INVENTOR  
R. L. Bowman  
BY Munn & Co.  
ATTORNEYS

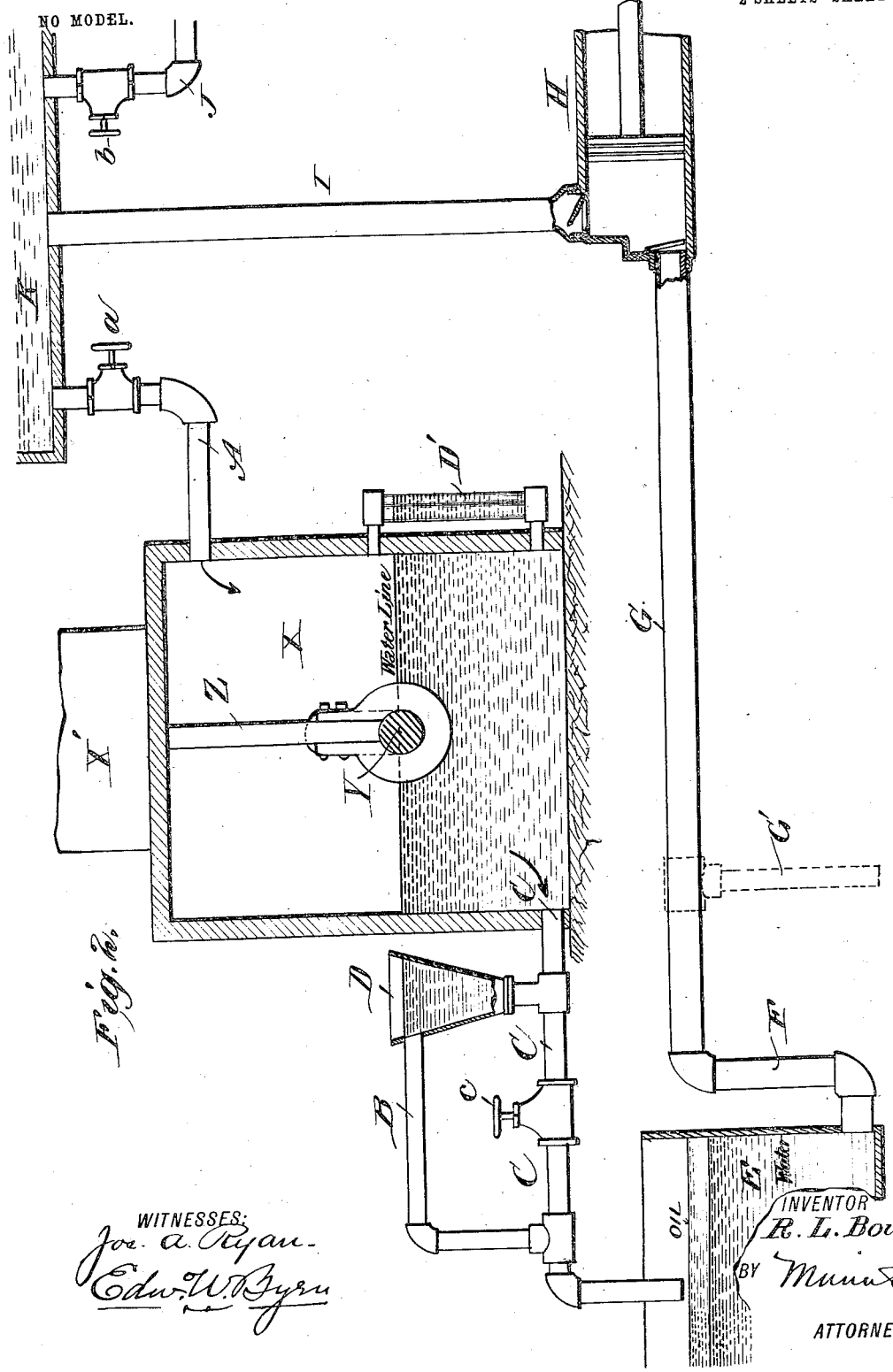

No. 771,703.

Patented October 4, 1904.

UNITED STATES PATENT OFFICE.

ROBERT LEE BOWMAN, OF PINEVILLE, KENTUCKY.

COOLING AND LUBRICATING CRANK-CASE ENGINES.

SPECIFICATION forming part of Letters Patent No. 771,703, dated October 4, 1904.

Application filed April 23, 1904. Serial No. 204,551. (No model.)

*To all whom it may concern:*

Be it known that I, ROBERT LEE BOWMAN, a citizen of the United States, residing at Pineville, in the county of Bell and State of Kentucky, have invented a new and useful Improvement in Processes and Apparatus for Cooling and Lubricating Crank-Case Engines, of which the following is a specification.

In crank-case steam-engines—such, for instance, as those of the Westinghouse type—great difficulty has been experienced in keeping the bearings cool and properly lubricating the same. When the bearings become heated, they expand and rapidly wear and the excessive heat carbonizes or cooks the oil, the difficulty being rapidly increased by the increased friction of the rubbing parts from expansion.

Crank-case engines have been lubricated within by a floating body of oil contained in the crank-case and sustained upon a permanent subjacent body of water. Into this oil the revolving cranks dip and by splashing and otherwise distribute the lubricant upon the wearing-surfaces. This permanent body of water soon becomes as hot as the crank-case itself, and the heat and the agitation by splashing soon churns up the oil and water into an emulsion, which not only is unfavorable for lubrication, but from which the oil cannot be recovered in normal condition fit to be again used in the oil-cups.

My invention consists of a novel process and apparatus for cooling and lubricating the bearings, in which the crank-case is never allowed to reach a high temperature and the oil is neither emulsified nor cooked, but is constantly removed in normal condition from the crank-case as it accumulates and is separated by gravity and is used over and over again, thereby insuring a great saving in oil and avoiding the disastrous heating and wear of the rubbing parts of the engine, as well as greatly increasing the efficiency of the latter and economizing fuel.

My invention consists in maintaining a constant flow of cold water through the crank-case and sustaining a supernatant film of oil thereon into which the cranks dip and effecting the gradual and constant removal of this oil in normal condition and separating it from the water for reuse, as will be hereinafter fully described with reference to the drawings, in which—

Figure 1 is a vertical section taken longitudinally to the crank-shaft; and Fig. 2 is a section at right angles taken on the line 2 2 of Fig. 1, showing also the connecting-pipes and apparatus employed for carrying out my process.

In the drawing Fig. 1, X is the crank-case, and X' the superposed cylinders carrying pistons, which by connecting-rods Z are coupled to the crank portions of the rotary shaft Y. This shaft is journaled in bearings $d$ in the sides of the crank-case, which bearings are lubricated by the dripping of oil from the superposed cups $e$, fixed to the sides of the cylinders.

Within the crank-case is maintained a constantly-changing body of water, which is maintained at the level marked "water-line" and on which floats a film of oil gathered from the leakage from the bearings and into which oil the cranks are projected as they revolve and their bearings lubricated, and a certain portion also is thrown up by splashing into the lower open ends of the cylinder. The cold water constantly flows in near the top of the crank-case through the inlet-pipe A and constantly flows out near the bottom through the outlet-pipe C, the water-level being maintained by external devices hereinafter described.

Referring now to Fig. 2, which shows a cross-section of Fig. 1, the inlet water-pipe is shown at A and the outlet-pipe at C. D is a funnel-shaped gage-cup which communicates with the outlet-pipe C and rises to a distance sufficiently high to maintain the water at the desired level in the crank-case, the water standing at the same level in the gage-cup as in the crank-case, the cup D thus serving also as a gage. At the desired water-level an overflow-pipe B is tapped into the gage-cup and its other end is turned down and coupled into the horizontal outflow-pipe C. Between this connection of pipes B and C and the gage-cup D there is a cut-off valve c, set in the pipe C, which valve when shut compels the water in the crank-case to rise in the gage-cup D to the same height as in the crank-case and then to overflow through pipe B into C again, and thence passes into a receiver E, which is in the nature of a separator for the oil and water, the oil rising by reason of its lighter gravity and accumulating in a layer on the surface, from which it is skimmed off and filtered for use again. The separator E has a stand-pipe F, which is tapped into the bottom of the separator and rises to within four or five inches of the top. K is a large water-supply tank arranged in elevated position in relation to the crank-case. From this supply-tank water is continuously fed through a pipe A and valve a into the crank-case. The supply-tank K and separator E are preferably made of such capacity as to furnish water enough to occupy a day's time in running through the crank-case from the supply-tank to the separator. If there is available an unlimited water-supply, tank K can be dispensed with and the water can be introduced direct through pipe A. This water in such case after passing through the crank-case into the separator E may be allowed to run to waste through the pipe F and a waste-pipe, such as is shown in dotted lines at G', the oil being gradually separated and saved by rising in the separator without any attention, since the outflow through pipe F is below the level of the oil. In a majority of cases, however, where it is an object to economize the water, the large supply-tank K is filled from the water-mains through a pipe J and valve b, and after it is once filled no more water is required, as the water then passes through supply-pipe A into the crank-case, then through pipes B and C into the separator, and from the separator E is drawn off by pipes F and G by means of a pump H and is forced up into the tank K again through pipe I, the cooling in transit and the volume of water in the tank K being sufficient to keep a constant stream of cold water flowing through the crank-case all the time, even if the tanks be not made as large as described. When the crank-case is to be completely drained of its water and oil, the valve c is opened, and then all the water and oil flows out through the pipe C.

Instead of using the open gage-cup D an ordinary glass gage D' may be connected to the side of the crank-case to indicate the water-level. The pipe B may in such case be simply turned down to enter pipe C where the lower end of the gage-cup now is or it may be run straight into the crank-case at the desired water-level.

By means of this system of constant circulation of cold water through the crank-case the following important advantages are secured:

First, it affords a perfect and automatic regulation of high-speed crank-case engines.

Secondly, it prevents the expansion of the bearings by keeping them cool, and thus avoids the wear of the bearings.

Third, it prevents the oil from cooking by the great heat and secures the recovery of so large a quantity of the same in normal condition as to reduce the current expense for oil to about one-twelfth of that ordinarily required in this class of engines.

Having thus described my invention, what I claim as new, and desire to secure by Letters Patent, is—

1. The process of cooling and lubricating crank-case engines, which consists in producing a constant flow of cold water through the crank-case and maintaining on the surface of this changing water a supernatant layer of oil substantially as described.

2. The process of cooling and lubricating crank-case engines, which consists in producing a constant flow of cold water through the crank-case, maintaining on the surface of the changing water a supernatant layer of oil and maintaining automatically the level of the oil substantially as described.

3. The process of cooling and lubricating crank-case engines, which consists in producing a constant flow of cold water through the crank-case, maintaining on the surface of the changing water a supernatant layer of oil, maintaining the level of the oil and separating the admixed oil from the water which passes on through substantially as described.

4. The process of cooling and lubricating crank-case engines, which consists in producing a constant flow of cold water through the crank-case, maintaining on the surface of the changing water a supernatant layer of oil, maintaining the level of this oil, separating the admixed oil from the water which passes on through, cooling this water and returning it to the inflow-supply substantially as and for the purpose described.

5. The combination with a crank-case engine; of an inlet water-supply pipe and two outlet-pipes one arranged at the bottom of the crank-case and the other at the desired water-level, said pipes being in communication with each other at opposite ends, a valve arranged in the lower pipe between the ends of the upper pipe, and a gravity separator-tank having a stand-pipe opening at its lower end into the separator substantially as shown and described.

6. The combination with a crank-case engine; of an inlet water-supply pipe, two outlet-pipes, one arranged at the bottom of the crank-case and the other at the desired water-level and communicating with the lower one at its outer end, an open gage-cup connecting the upper and lower pipes, a valve arranged in the lower pipe between the point of union of the gage-cup on one side and the upper pipe on the other side, and a separator-tank having an overflow stand-pipe as described.

7. The combination with a crank-case engine; of a water-supply tank and an inlet-pipe connecting the same with the crank-case, overflow outlet-pipes as described for maintaining the level of water in the crank-case, a separator-tank with pipe opening into the bottom thereof, a pump connecting with said pipe and another pipe connecting the pump with the water-supply tank substantially as described.

ROBERT LEE BOWMAN.

Witnesses:
 W. T. DAVIS,
 O. V. RILEY.